Nov. 5, 1974  JEAN-PIERRE MONTILLIER  3,846,264

METHOD FOR SYNTHESIZING DICARBAZOLYL CYCLOBUTANE

Filed Dec. 7, 1973

United States Patent Office 3,846,264
Patented Nov. 5, 1974

3,846,264
METHOD FOR SYNTHESIZING DICARBAZOLYL CYCLOBUTANE
Jean-Pierre Montillier, Trumbull, Conn., assignor to Pitney-Bowes, Inc., Stamford, Conn.
Filed Dec. 7, 1973, Ser. No. 422,755
Int. Cl. B01j 1/10
U.S. Cl. 204—158 R                    17 Claims

ABSTRACT OF THE DISCLOSURE

A method is disclosed for continually synthesizing 1,2-dicarbazolyl cyclobutane. A solution of N-vinylcarbazole in acetone is continuously added to a reactor in which a UV light source is disposed. Photocyclodimerization takes place and dicarbazolyl cyclobutane is precipitated. The contents of the reactor are removed and filtered, thereby isolating the precipitated DCC from the solution. The filtrate may then be upgraded and returned to the reactor.

BACKGROUND OF THE INVENTION

In the making of copies by the electrophotographic method, a photosensitive material is used to make a coating on a support, upon which coating an electrostatic image may be produced. One material which has attractive properties for use as an organic photoconductor is 1,2-dicarbazolyl cyclobutane (DCC). The drawbacks to the use of DCC as an organic photoconductor include its relative expensiveness and the lack of a process to produce cheaply electrophotographically pure DCC in a continuous or semi-continuous process.

DCC is usually prepared by cyclodimerization of mono-vinylcarbazole in methanol in the presence of Ferric nitrate as disclosed by Chi Hua Wang in Journal of Organic Chemistry 35 (6) 2045 (1970). However, this method is very time consuming and the reaction yield is on the average no more than 30% and the product of the reaction requires several recrystallizations prior to use in electrophotography.

It is also known that DCC can be prepared by photo-cyclodimerization of mono-vinylcarbazole in various conditions. One such disclosure is found in "Chemical Communications," (1970) 1110–1111, Y. Shirota et al "Oxygen Catalysed Photocyclodimerization of N-vinylcarbazole in Donor Solvents." Unfortunately, the disclosures to date have not disclosed a method whereby large quantities of electrophotographically pure DCC can be produced and none to date have shown where a continuous or semi-continuous process may be used.

SUMMARY OF THE INVENTION

It has been found that photographically pure DCC may be continually produced by preparing a 0.5 to 2.5 molar solution of N-vinylcarbazole (NVC) in acetone. This solution is continually fed to a reaction vessel wherein the solution is constantly agitated and exposed to a source of ultraviolet light. Upon irradiation, photocyclodimerization takes place and DCC which has a low solubility in acetone (58 grams per liter compared to 910 grams per liter for NVC) precipitates from the solution. The same, along with the solute, is removed from the reaction vessel and filtered. The DCC remains on the filter and the solution passes therethrough, is upgraded with fresh NVC and returned to the reacting vessel.

DESCRIPTION OF THE PREFERRED EMBODIMENT

Figure 2:
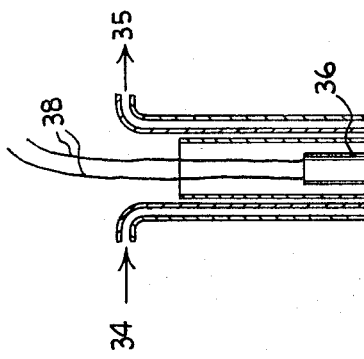
FIG. 2 is an enlarged cross sectional view of a portion of the reaction vessel shown in FIG. 1.

Referring now to the drawing, a system for continuously producing dicarbazolyl cyclobutane is shown generally at 10 and is provided with a reservoir or mixing container 12 wherein a solution 13 of N-vinylcarbazole in acetone may be delivered or mixed. The container 12 has an outlet 14 at the bottom thereof, to which outlet a tube 16 having a valve 18 therein is connected. Located below the level of the container 12 is a reaction vessel, or reactor, 20 for receiving solution 21. The reaction vessel 20 has a cover 22 thereover, which cover has an opening 24 that receives the tube 16 to provide communication between the container 12 and the reaction vessel.

Located at the bottom of the reaction vessel 20 is an agitator 26 which is actuated by a variable motor 28. The agitator 26 may be, for example, a magnetic member or a propeller which is coupled to and rotated by action of the motor 28 shaft. Received within another opening 30 of the cover 22, is a double walled quartz immersion well 32 which has an inlet 34 and an outlet 35 thereby providing a channel through which cooling water may flow as indicated by the arrows. The quartz well 32 in return receives a UV lamp 36 which has leads 38 leading therefrom to a power supply 40. A Pyrex sleeve 41 may be placed between the quartz well 32 and the UV lamp 36 to serve as a filter.

Another opening 42 in the cover 22 is provided to receive the bottom portion of a condenser 44 which condenses any solution which may evaporate and return it to the reaction vessel 20. The further advantage of the condenser 44 is to prevent a high pressure from developing within the vessel 20. Received within another opening 46 of the cover 22 is a gas inlet pipe 48 having a valve 50 therein. Secured to the lower end of the gas inlet pipe is a gas tube 52 which leads to the bottom of the reaction vessel 20 in such a way that when bubbling gas concurrently with stirring fine bubbles are formed which will evenly surround the quartz well 32. In still another opening 54 of the cover 22 a discharge tube 56 is provided which has a valve 58 therein. The discharge tube 56 leads to a filtration unit 60 in the form of an enclosed Buchner funnel which has a foraminous plate 62 therein that supports a filter paper 64 and a lid 65 which is used when the solution 21 is to be siphoned. Located below the Buchner 60 is a filtrate receiving container 66 which receives the filtrate 67 and the container has an opening 68 at the top thereof which receives the lower end of the Buchner. At the top of the filtrate receiving container 66 is an outlet 70 having a valve 72 therein which outlet 70 may be connected to a vacuum line to create a negative pressure above the level of the filtrate 67. At the lower end of the filtrate receiver 66 is another outlet 74 which receives a circulating tube 76 that leads back to the container 12. The circulating tube 76 has a valve 78 and a pump 80 therein.

The continuous process may be carried out as follows: An unsaturated solution of N-vinylcarbazole in acetone is prepared and poured into the container 12 or, alternately, the container may be filled with acetone and a sufficient quantity of N-vinylcarbazole added thereto and dissolved. It is preferable that the solution of NVC in acetone be approximately a 0.5 to 2.5 molar solution. A sufficient quantity of the NVC-acetone solution is passed through the tube 16 into the reaction vessel 20 until the reaction vessel is sufficiently full of solution 21 as indicated. It is preferable that the lamp 36 be complete covered with solution in order to make full use of the emitted radiation. The motor 28 is actuated so that the solution is constantly being stirred by the agitator 26. Along with the stirring, an oxygen containing gas, such as air, is supplied from gas inlet 48 through the tube 52 into the solution for the purpose of further disturbing the solution 21 and providing a sufficient supply of oxygen. The vessel 20 should be sufficiently large and stirring should be adequate so that a high degree of reaction will take place without the DCC readily forming lumps or depositing on the surfaces of the various reaction vessel 20 components before it is removed.

The quartz immersion well 32 is immersed in the solution 21 and extends into the vessel 20 a short distance from the bottom thereof. A lamp capable of emitting ultraviolet light, i.e. light having a wavelength between approximately 200–400 nm., is inserted into the double walled quartz tube 32 which has cooling water constantly circulating therethrough. The water keeps the quartz immersion well 32 cool thereby assuring good dissipation of the heat generated by the lamp 36 and preventing heating of the solution. It is necessary to prevent the heating of the solution otherwise it would result in excessive evaporation of the same since acetone has a low boiling point and a high vapor pressure. The UV light coming from the lamp 36 is of sufficient energy to activate the double bond of the vinyl group in the monovinyl carbazole so as to bring about a cyclodimerization of the NVC to DCC. It is preferable that the quartz well 32 be provided with a Pyrex filter when a small reaction vessel, 500 ml. or less, 20 is used so that high energy UV light from the lamp will be absorbed. The Pyrex filter 41 will absorb all light waves having a wavelength less than 300 nm. This is desirable as the light waves below 300 nm. have such high energy that too rapid a reaction would take place in a smaller vessel, thus drastically reducing the controllability of the continuous operation. In a large reaction vessel 20, such a filter would not be required.

The solution 21 is constantly kept in motion by the agitator 26 as well as by the source of air 52. Agitation of the solution 21 is an important feature of this invention as it promotes reaction and inhibits the deposition of DCC on the quartz well 32. It has been found that the presence of an oxygen containing gas bubbling through the solution is highly desirable and that undesired reactions could take place except for its presence. It was found in experiments that when an oxygen containing gas is not utilized, a gummy substance is at times created, this gummy substance being low molecular weight polyvinyl carbazole. It is known that the presence of oxygen inhibits polymerization and acts as a catalyst in the cyclodimerization of NVC. Another reason for the need of constant agitation of the solution is that it inhibits the formation of DCC along the walls of the vessel 20 and on the quartz well 32. If a sufficient quantity of DCC is deposited upon the quartz well 32, it will prevent the transmission of UV light to the solution thereby inhibiting or stopping the reaction.

Figure 1:
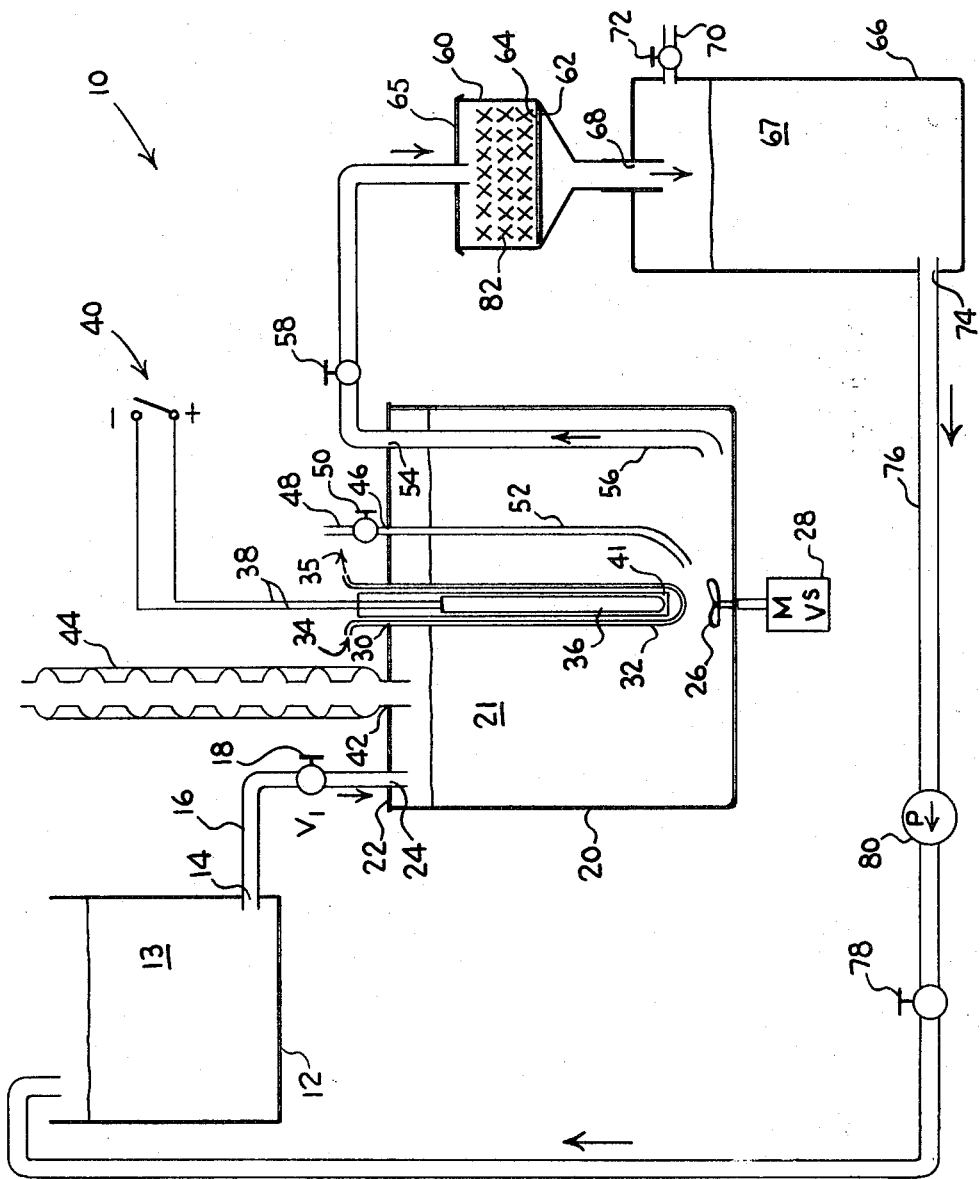
FIG. 1 is a schematic representation of a system for continually producing dicarbazolyl cyclobutane.

It has been found that when using a 450 watt medium pressure mercury lamp, DCC will begin to precipitate from the solution after approximately 20 to 45 minutes, depending upon the size of the reaction vessel 20. This time, however, could be shortened if desired by using a more powerful light source. Once reaction begins, and DCC starts to precipitate it is necessary to start withdrawing the reacted solution through the discharge tube 56 and then begin to add unreacted solution through the inlet tube 26 by turning on the valve 18. The reacted solution is then passed through the Buchner funnel 60 and the DCC is removed therefrom as indicated at 82 in FIG. 1. A plurality of Buchners 60 and filtration containers 66 may be used so that after one filter is loaded with DCC, the discharged reacted solution may be directed to another Buchner. In this way, as the material is being removed from one Buchner 10 the reaction may continue to take place. The spent liquid is directed from the filtration container 66 back to the container 12 by opening valve 78 and activating pump 80. The spent solution may then be upgraded by the addition of monovinyl carbazole.

Another preferred method is to continue recycling the solution without continuously upgrading the same by the addition of NVC, the process being either continuous or semi-continuous. In a semi-continuous process, or continuous batch process, only one filtration unit 60 and filtration container 66 need be used. The solution, such as a 2.5 molar solution of NVC in acetone is placed into the reaction vessel 20 as previously. The motor 28 is started and air is passed through the gas tube 52. After this, the UV lamp 36 is turned on a sufficient amount of time to bring about precipitation of DCC. After the precipitation has taken place, the lamp 36 is turned off. It is noted that the reaction proceeds rapidly, but instead of adding a new solution through tube 16, the lamp 36 is turned off and the reaction is stopped. After the lamp 36 is turned off, the reacted solution is pumped through the discharge tube 56. This is accomplished by turning the valve 58 to the open position and the solution 21 is forced through the discharge tube 56 due to the negative pressure in the filtration container 66, which negative pressure is brought about by the presence of the vacuum line 70.

It will be appreciated that not all of the precipitated material may pass through the discharge tube as large lumps tend to form, especially at high NVC concentrations, when new solution 21 is not added; however, a large percentage of the solvent 21 is drawn through discharge tube 56 under any circumstances. After a sufficient quantity of reacted solution is withdrawn, the valve 58 is closed, the valve 73 is opened and the pump 80 activated. This will pump the spent solvent 67 from the filtration container 66 into the first container 12 where the spent solvent is mixed with the remainder of the original solvent. This material is then supplied to the reaction vessel 20 and the agitator 26 and air 48 are activated once more. While the solvent 21 is being agitated and disturbed, the DCC is removed from the filtration unit 60 and a new filter paper 64 is inserted therein.

It was observed that when the agitator 26 and air disturbed the solvent 21 those lumps of DCC remaining in the solvent which were not removable through the discharge pipe 56 broke down and could readily be removed. At this junction, the lamp 36 may be turned back on and the reaction progressed, or the solvent 21 may be discharged one more time through the filter paper and all of the DCC removed therefrom. This re-supplying of the filtrate 67 may be continued until such time as practically all the NVC has dimerized. It will be appreciated, however, that production of DCC will be limited by its solubility in acetone. When the yield reaches a minimum quantity through use of the spent solution 67, the same may be placed into the container 12 and fresh NVC added to the solution 13 so that it is brought up to a high molar concentration. The process may then be repeated.

Solvents other than acetone may be used in the synthesis of DCC, as for example, ethyl acetate and methanol. On the basis of solubility of NVC, acetone is preferable. The volume of solvent required to dissolve 10 grams of NVC is as follows:

|  | Ml. |
|---|---|
| Acetone | 11 |
| Ethyl acetate | 21 |
| Methanol | 429 |

Consequently, the preferred solvent for the production of DCC as described herein is acetone.

In the following examples, high purity DCC was produced by subjecting a solution of NVC in acetone to ultraviolet light irradiation.

EXAMPLE I

A 500 ml. volume of a 0.5 molar solution of mono N-vinylcarbazole in acetone was introduced into a 1 liter reaction vessel and a water cooled quartz immersion well was immersed into the solution. The 0.5 molar solution contained 48 grams of NVC.

The solution was agitated with a magnetic stirrer, no oxygen containing gas being bubbled through this solution. A 450 w. medium pressure Hg lamp was inserted into the quartz well and a Pyrex filter was placed between the Hg lamp and the quartz well. The Hg lamp was turned on for 30 minutes, which proved to be the time required for completion of the reaction and precipitation of DCC.

After the DCC began to precipitate, the lamp was turned off and the contents of the reactor were filtered in order to separate the solid DCC from the solution. The DCC appeared as white crystals with a melting point of 196° C. The amount of DCC obtained in this run was approximately 20 grams, giving a yield of 41%. This resulted in a yield rate of 0.66 grams DCC per minute of irradiation.

EXAMPLE II

A 500 ml. volume of a 1 molar solution of mono N-vinylcarbazole in acetone was placed in the same system as described in Example I. The quantity of NVC was 96 grams. Again, the magnetic stirrer was activated but no oxygen containing gas was bubbled through the solution. The lamp was turned on for 20 minutes at which time the DCC fully precipitated from the solution. The precipitate amounted in this case to 25 grams giving a 31% yield and a yield rate of 1.25 g. DCC per minute of irradiation.

EXAMPLE III

The steps of this process were the same as Example II except that a 2 molar solution was used (193 grams of vinylcarbazole in 500 ml.). The lamp was turned on for a period of 65 minutes at which time the precipitation of DCC occurred.

After filtration of the reactor content, 51 grams of solid were obtained. However, in this case a small amount of gummy material was present, approximately 5 grams. It was determined to be some type of low molecular weight poly-N-vinylcarbazole and was produced due to inefficiency of the dimerization reaction.

The DCC yield in this case was 28% giving a yield rate of 0.78 grams DCC per minute of irradiation.

EXAMPLE IV

Example III was repeated except that a moderate flow of air was bubbled through the solution. The lamp was turned on and after 30 minutes it had to be turned off due to the formation of a very large precipitate of DCC. The filtered and dried precipitate weighed 84 grams. It was pure DCC with a melting point of 196° C. The yield was 43.5% giving a yield rate of 2.8 grams DCC per minute of irradiation.

EXAMPLE V

A four neck, 5 liter round bottom flask was equipped with a condenser, an air inlet tube, a siphoning tube and an immersion quartz well. A 450 watt Hg lamp was inserted into the quartz well. No filter was inserted because of the size of the flask. The flask was filled with 4.7 liters of a one molar solution of mono N-vinylcarbazole in acetone, (907 grams of N-vinylcarbazole). The solution was stirred with a magnetic stirrer and air was bubbled through the solution at a rate such that, in combination with the magnetic stirring, the bubbles were uniformly dispersed throughout the solution.

The Hg lamp was turned on and after 45 minutes of irradiation a precipitate started to form. After approximately 15 additional minutes, the amount of solid became so great that efficient use of the light was inhibited. The lamp was turned off and the contents of the flask were siphoned and introduced into a large Buchner mounted on a filtering flask which was connected to a vacuum line. After most of the contents were siphoned out of the flask, the siphoning was discontinued and the precipitate allowed to rest upon the filter paper until the bulk of the liquid was moved therefrom. The DCC was then removed from the filter paper and thoroughly dried. It was found to be practically pure DCC with a melting point of 196° C. and well suited for electrophotographic applications. The amount of DCC collected was 243 grams giving a yield of 27% or a yield rate of 4 grams per minute of irradiation.

The spent solution was then upgraded by dissolving into it 508 grams of mono N-vinylcarbazole and returned to the flask. The lamp was turned on, and 30 minutes later a precipitate started forming and after 10 additional minutes the lamp had to be turned off because a large amount of precipitated solid had formed. The contents of the flask were siphoned out and treated as indicated above. Two hundred sixty grams of pure DCC were obtained giving a 22% yield or 6.5 grams per minute of irradiation.

The spent solution was re-introduced into the reactor and 800 ml. of fresh acetone were added to fill the reactor completely. This addition of acetone became desirable as some acetone is lost during the reaction because of the strong air flow and during filtration. The lamp was turned on for 25 minutes, then turned off again due to the large amount of precipitate that formed. The content of the flask was again treated as previously indicated in a Buchner funnel, the DCC removed, dried and weighed. It was found that 200 grams were obtained giving a yield of 22%. The yield rate was found to be 8 grams per minute.

The spent solution was re-introduced into the reactor with nothing more being added and the lamp was turned on for 25 minutes. The yield obtained was 120 grams of DCC, for a 17% yield or a 4.8 grams per minute of irradiation.

The filtered solution was once more returned to the flask and irradiated for a 30 minute period. A total of 100 grams DCC was collected for a yield of 14.5% or 3.3 grams DCC per minute of irradiation.

Once more the filtered solution was re-introduced into the flask with nothing being added and was irradiated for 30 minutes to yield 20 grams of DCC giving a 3% yield. This is the point where most of the formed DCC is solubilized and cannot be precipitated out. In order to increase the yield again it is just a matter of feeding some N-vinylcarbazole into the filtered solution, which was done.

Nine hundred grams of NVC were dissolved into the filtered solution from the above last step. The NVC dissolved readily. The solution was introduced into the flask and the lamp turned on in the same manner as previously.

After approximately 50 minutes of irradiation the lamp was turned off. A heavy precipitate of DCC was formed. The flask content was siphoned out and filtered to yield 253 grams of pure DCC giving a 28% yield or 5 grams per minute of irradiation.

The filtered solution was evaporated under vacuum to one-third its original volume. It crystallized immediately. The crystals were filtered and dried. They amounted to 250 grams consisting of 90% pure DCC. This material after one recrystallization from acetone would be as pure as previously obtained.

It must be noted that acetone is very inert photochemically and that in these conditions of use it can be recycled several times without any problem.

It is obvious at this point that the steps of the process could be repeated indefinitely to produce large quantities of pure DCC.

EXAMPLE VI

In order to determine whether the good results achieved with the bubbling of air was brought about by the added agitation or by the added amount of oxygen dissolved into the solution, it was decided to repeat the experiment using an inert gas. This was done by repeating the process as described in Example IV with the difference that nitrogen was bubbled through the solution instead of air. Again, a 2 molar solution of NVC in acetone was used. The nitrogen was bubbled into the solution for a 30 minute period prior to irradiation and during photolysis.

After 15 minutes of irradiation, cloudiness of the solution appeared, however, it did not lead to a DCC precipitate. The lamp was kept on for a total of 90 minutes. The cloudiness disappeared after 60 minutes leaving a clear solution. More acetone was added and a precipitate of low molecular weight polymer was formed of an amorphous nature.

No DDC formed in this case. Only polymerization took place.

Consequently, it can be concluded that if a gas is to be bubbled through the solution in order to increase the rate of reaction as achieved previously, the gas should be an oxygen-bearing gas. Putting it another way, it appears that the mechanism by which the air accelerates the reaction is the placing of additional oxygen into solution as opposed to simply increasing the agitation of the solution.

What is claimed is:

1. In a process for synthesizing 1,2-dicarbazolyl cyclobutane, the steps comprising: preparing a 0.5 to 2.5 molar solution of mono vinylcarbazole in a solvent selected from the group consisting of acetone, ethyl acetate and methanol, feeding the solution to a reactor container, agitating the contained solution, exposing the contained solution to a source of ultraviolet light, removing the solution from the container, passing the solution through a filter, collecting the solids and supplying the filtrate back to the reactor container.

2. The method of Claim 1 wherein said solvent is acetone.

3. The method of Claim 2 where an oxygen containing gas is constantly bubbled through the solution when the same is being exposed to the ultraviolet light.

4. The method of Claim 3 wherein said gas is air.

5. The method of Claim 4 wherein N-vinylcarbazole is added to the filtrate in order to upgrade it to a 0.5 to 2.5 molar solution.

6. The method of Claim 4 including filtering the light to remove light having a wavelength below 300 nm.

7. In a process for synthesizing 1,2-dicarbazolyl cyclobutane, the steps comprising: placing a quantity of 0.5 to 2.5 molar solution of mono vinylcarbazole in acetone in a container, feeding at least a portion of the solution from the container to a reaction vessel, agitating the solution within the reaction vessel exposing the solution in the reaction vessel to a source of ultraviolet light to precipitate 1,2-dicarbazolyl cyclobutane from the solution, removing at least a portion of the contents from the reaction vessel, passing the removed contents through a filtration unit, supplying the filtrate back to the container and repeating the procedure.

8. The method of Claim 7 wherein an oxygen containing gas is constantly bubbled through the solution when the same is being exposed to the ultraviolet light.

9. The method of Claim 8 wherein the oxygen containing gas is air.

10. The method of Claim 9 wherein N-vinylcarbazole is added to the filtrate in order to upgrade it to a 1 to 1.5 molar solution.

11. The method of Claim 9 wherein a glass tube is immersed in the solution in the reaction vessel and the source of ultraviolet light is inserted within the glass tube.

12. The method of Claim 11 wherein the glass tube is quartz.

13. In a process for synthesizing 1,2-dicarbazolyl cyclobutane, the steps comprising: placing a quantity of a 0.5 to 2.5 molar solution of mono vinylcarbazole in acetone in a reaction vessel, agitating the contained solution, exposing the solution in the reaction vessel to a source of ultraviolet light to precipitate dicarbazolyl cyclobutane, removing the contents of the container and passing it through a filter, upgrading the filtrate by adding mono vinylcarbazole to produce a 0.5 to 2.5 molar solution, and supplying the upgraded solution back to the reaction vessel and repeating the procedure.

14. The method of Claim 13 where air is constantly bubbled through the solution when the same is being exposed to the ultraviolet light.

15. The method of Claim 14 wherein a quartz immersion well is immersed in the solution in the reaction vessel and the source of ultraviolet light is inserted within the quartz well.

16. The method of Claim 14 wherein a double walled quartz tube is immersed in the reaction vessel, the source of ultraviolet light is inserted within the quartz tube, and water is passed between the walls of the glass tube to cool the same.

17. The method of Claim 16 including the step of inserting a filter between the ultraviolet lamp and the quartz tube.

References Cited
UNITED STATES PATENTS 3,483,103   12/1969   Wakamatsu et al. __ 204—158 R HOWARD S. WILLIAMS, Primary Examiner